US009901040B2

(12) United States Patent
Hashaikeh et al.

(10) Patent No.: US 9,901,040 B2
(45) Date of Patent: Feb. 27, 2018

(54) CELLULOSE BLENDS WITH ENHANCED WATER RETENTION AND THEIR USE IN IRRIGATION

(71) Applicant: Kahlifa University of Science and Technology, Abu Dhabi (AE)

(72) Inventors: Raed Hashaikeh, Abu Dhabi (AE); Ali Asghar, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 329 days.

(21) Appl. No.: 14/361,983

(22) PCT Filed: Nov. 30, 2012

(86) PCT No.: PCT/CA2012/001105
§ 371 (c)(1),
(2) Date: May 30, 2014

(87) PCT Pub. No.: WO2013/078547
PCT Pub. Date: Jun. 6, 2013

(65) Prior Publication Data
US 2014/0326029 A1    Nov. 6, 2014

Related U.S. Application Data

(60) Provisional application No. 61/566,180, filed on Dec. 2, 2011.

(51) Int. Cl.
*A01G 25/00*    (2006.01)
*A01G 7/00*    (2006.01)
(Continued)

(52) U.S. Cl.
CPC ............... *A01G 25/00* (2013.01); *A01G 1/00* (2013.01); *A01G 7/00* (2013.01); *A01G 9/1086* (2013.01); *A01G 31/001* (2013.01); *C05F 11/00* (2013.01); *C05G 3/0047* (2013.01); *C05G 3/04* (2013.01); *C08B 16/00* (2013.01); *C08J 3/075* (2013.01); *C08L 1/04* (2013.01); *C09K 17/32* (2013.01);
(Continued)

(58) Field of Classification Search
CPC ................ C08L 1/04; C08L 1/02; C09K 8/90
See application file for complete search history.

(56) References Cited

U.S. PATENT DOCUMENTS

| 4,919,681 A | 4/1990 | Tyler et al. |
| 5,382,270 A * | 1/1995 | Graham ............... A01G 25/167 47/48.5 |

(Continued)

FOREIGN PATENT DOCUMENTS

| EP | 1 704 769 A1 | 9/2006 |
| WO | WO 2011/030170 A1 | 3/2011 |

OTHER PUBLICATIONS

Zhang et al. Carbohydrate Polymers vol. 84, Issue 1, Feb. 11, 2011, pp. 40-53.*

(Continued)

*Primary Examiner* — Michael A Salvitti
(74) *Attorney, Agent, or Firm* — Myers Bigel, P.A.

(57) ABSTRACT

Water-retaining gel compositions, methods of making water-retaining gel compositions, and the uses thereof for enhancing soils, preparing plant growth media and facilitating the growth of plants therein are disclosed.

11 Claims, 5 Drawing Sheets

Schematic of GELPEO formed through aqueous PEO assisted regeneration of cellulose.

(51) Int. Cl.
 C05G 3/04   (2006.01)
 C08J 3/075  (2006.01)
 C09K 17/32  (2006.01)
 C08L 1/04   (2006.01)
 C08B 16/00  (2006.01)
 A01G 9/10   (2006.01)
 A01G 31/00  (2018.01)
 C05F 11/00  (2006.01)
 C05G 3/00   (2006.01)
 A01G 1/00   (2006.01)
 C08L 1/02   (2006.01)
 C09K 8/90   (2006.01)

(52) U.S. Cl.
 CPC ........ C08J 2301/04 (2013.01); C08J 2471/02
       (2013.01); C08L 1/02 (2013.01); C09K 8/90
                                        (2013.01)

(56) References Cited

U.S. PATENT DOCUMENTS

| | | | |
|---|---|---|---|
| 5,747,125 A * | 5/1998 | Markulin | A22C 13/0013 264/203 |
| 6,436,325 B1 | 8/2002 | Kido et al. | |
| 7,730,662 B2 | 6/2010 | Krysiak et al. | |
| 2002/0174697 A1 | 11/2002 | Reid et al. | |
| 2006/0112749 A1 | 6/2006 | Noll et al. | |
| 2008/0051502 A1 | 2/2008 | DeRosa et al. | |
| 2009/0192264 A1 | 7/2009 | Laborie et al. | |
| 2011/0003936 A1 | 1/2011 | Chen et al. | |
| 2011/0163266 A1 | 7/2011 | Correa Delgado et al. | |
| 2011/0196094 A1 * | 8/2011 | Hamad | B82Y 30/00 525/54.21 |
| 2013/0090401 A1 * | 4/2013 | Hashaikeh | A61L 27/56 521/182 |
| 2013/0189589 A1 * | 7/2013 | Hashaikeh | H01G 9/028 429/308 |
| 2014/0326029 A1 * | 11/2014 | Hashaikeh | C05F 11/00 71/1 |

OTHER PUBLICATIONS

Allion et al. Electrochimica Acta 55(2010) 5186-5194.*
Hashaikeh et al. Carbohydrate Polytmers 83 (2011) 1088-1094.*
Kloser et al. Langmuir 2010, 26(16) 13450-13456.*
Methanol, anhydrous. Obtained from http://www.sigmaaldrich.com/catalog/product/sial/322415?lang=en&region=US on May 10, 2017. No Author, No Date.*
International Search Report and Written Opinion Corresponding to International Application No. PCT/CA2012/001105; dated Mar. 13, 2013; 11 Pages.
International Preliminary Report on Patentability Corresponding to International Application No. PCT/CA2012/001105; dated Jun. 12, 2014; 9 Pages.

* cited by examiner

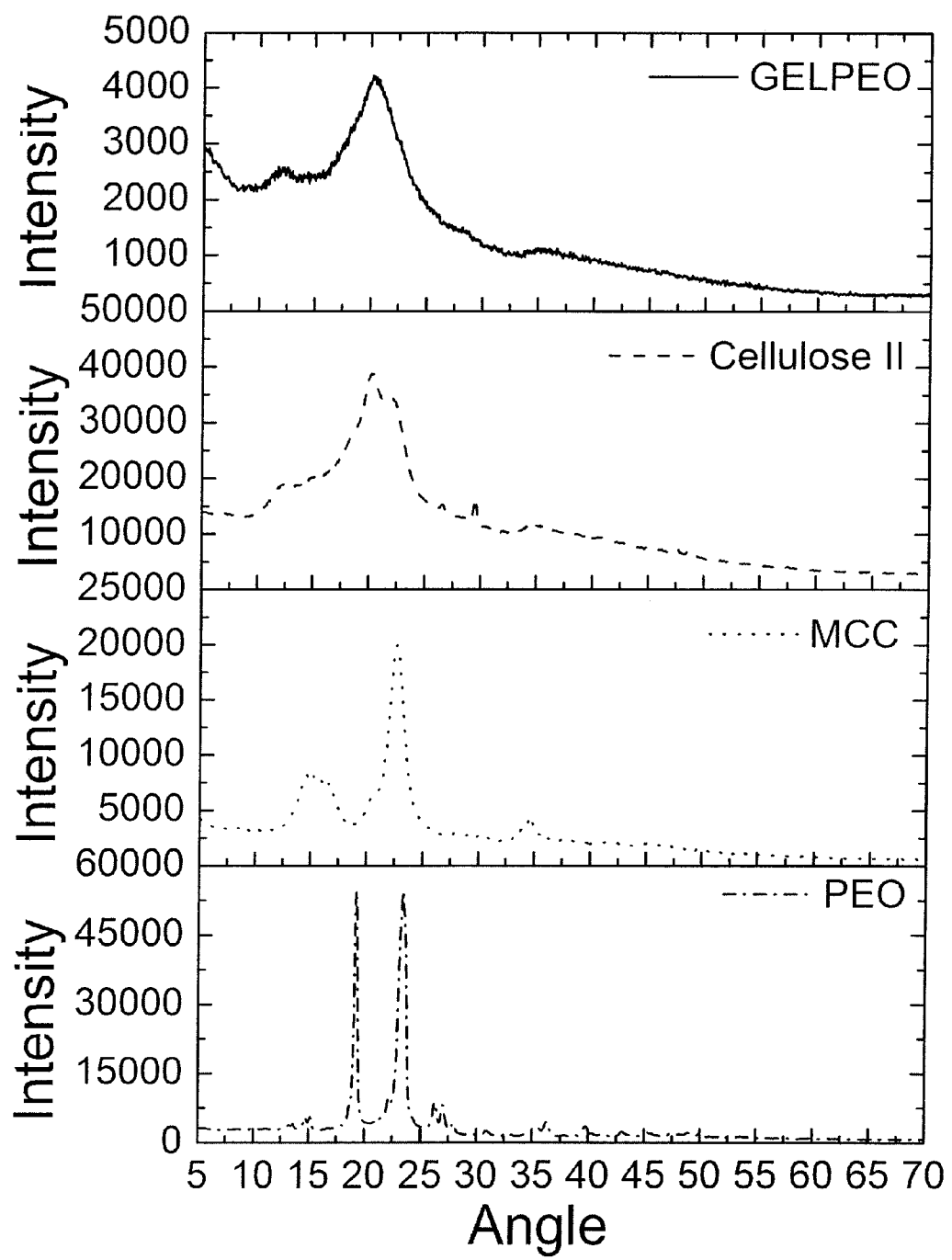
Figure 1: X-Ray diffractogram of GELPEO, Cellulose II, MCC and PEO.

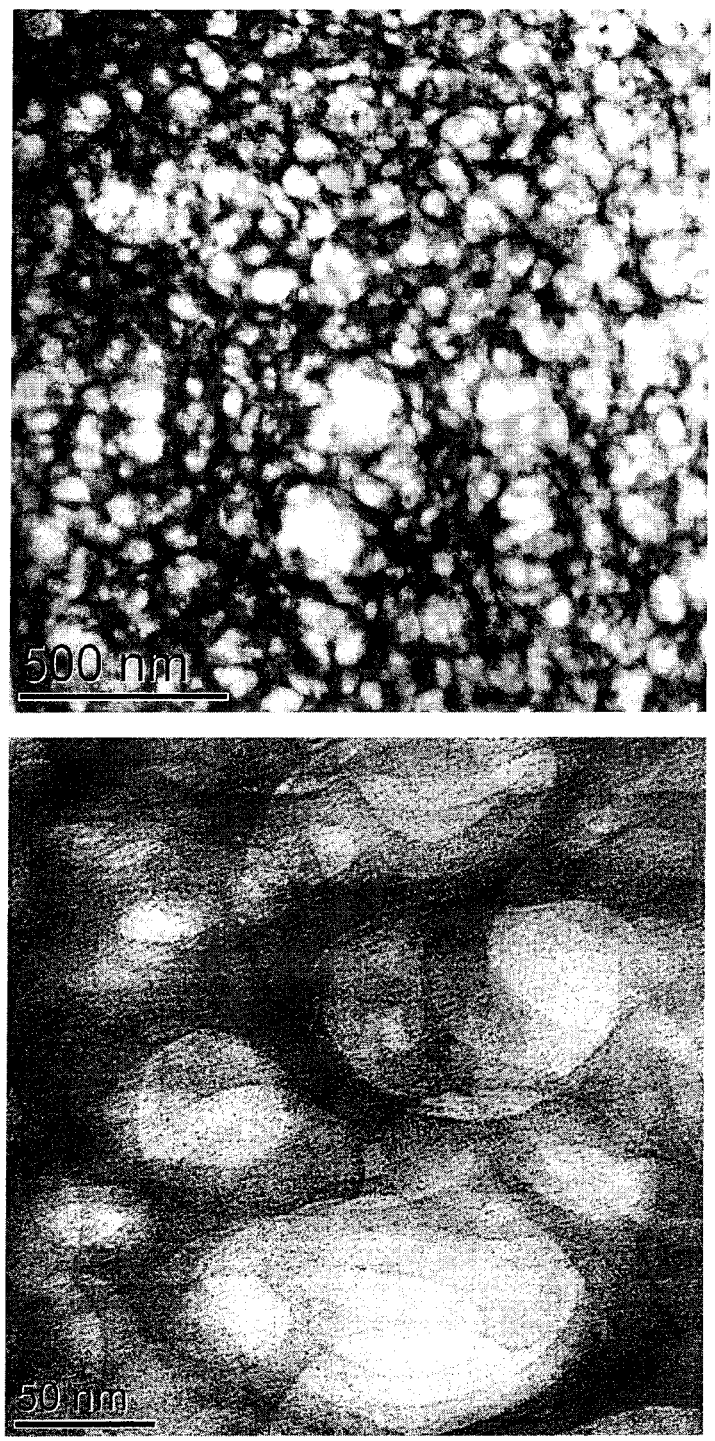
Figure 2: TEM images of GELPEO (a & b) showing networked dark regions (Cellulose II) and packets of encapsulated lighter regions (PEO).

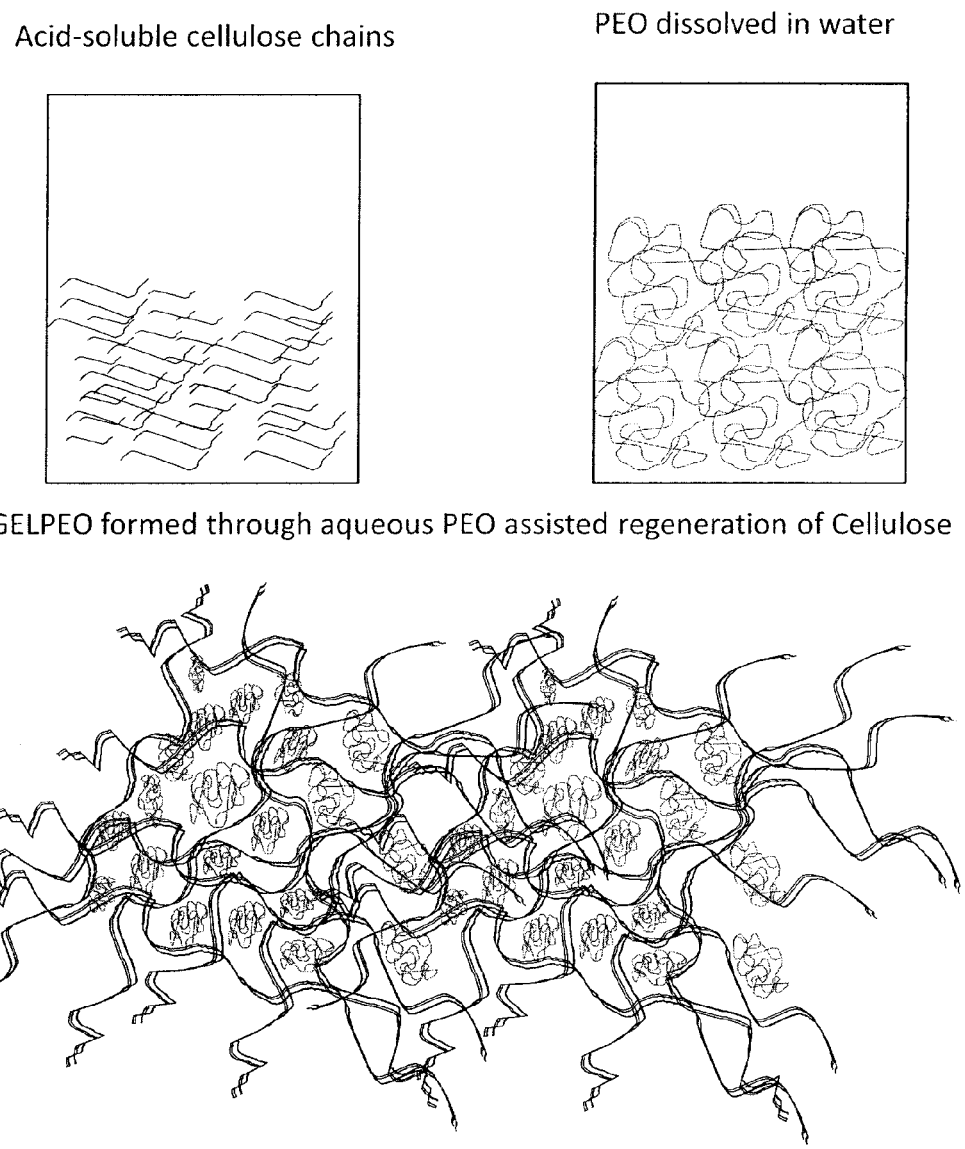
Figure 3: Schematic of GELPEO formed through aqueous PEO assisted regeneration of cellulose.

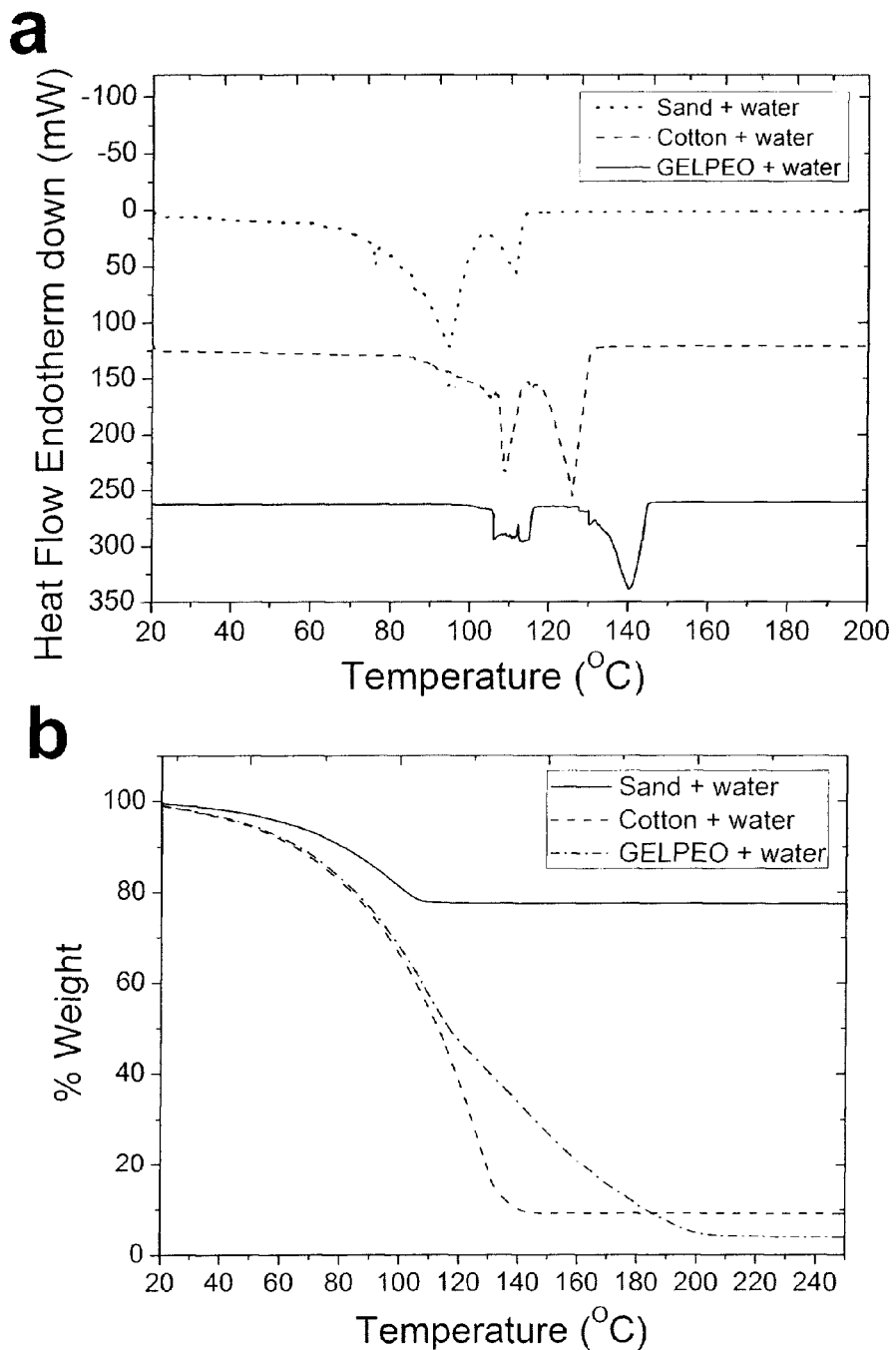
Figure 4: DSC curve (a) and Thermogravimetric analysis (b) for samples of hydrated sand, cotton and GELPEO.

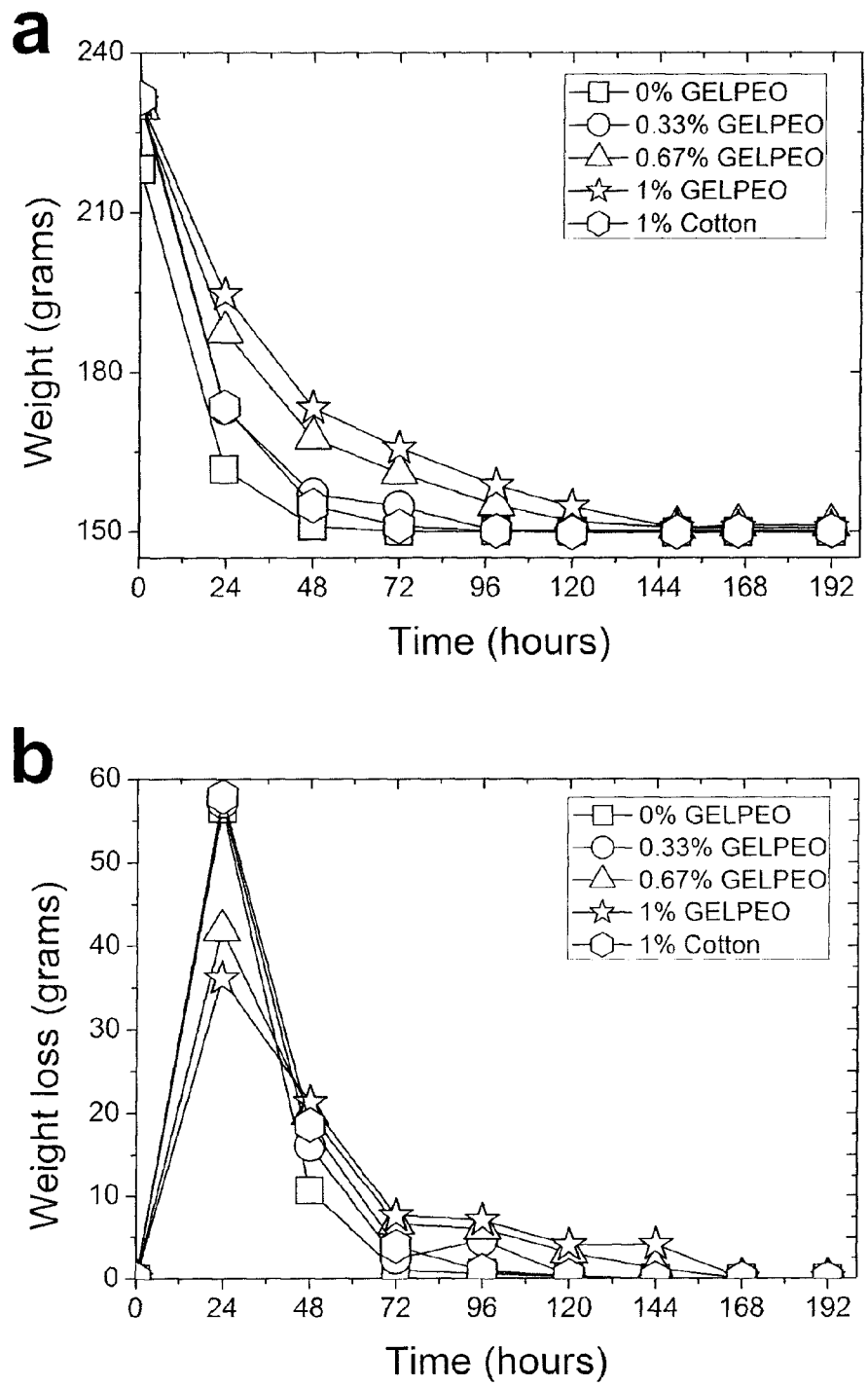
Figure 5: (a) Weight and (b) weight loss of wet sand samples with different weight percentages of GELPEO and cotton over time during outdoor testing.

CELLULOSE BLENDS WITH ENHANCED WATER RETENTION AND THEIR USE IN IRRIGATION

RELATED APPLICATIONS

This application is a 35 U.S.C. § 371 national phase application of PCT Application PCT/CA2012/001105, filed Nov. 30, 2012, which claims the benefit of U.S. Provisional Application Ser. No. 61/556,180, filed Dec. 2, 2011. The entire contents of each of these applications is fully incorporated herein by reference.

FIELD OF THE INVENTION

The present invention concerns cellulose gel compositions and the use thereof for enhancing soils (particularly sandy soils), preparing plant growth media and facilitating the growth of plants therein.

BACKGROUND OF THE INVENTION

Numerous countries throughout the world—particularly in desert and equatorial regions—are characterized by an arid climate and sandy soils. These sandy soils have low water retention capability and require large amounts of water for irrigation purposes. Due to the arid climate and lack of fresh water resources, the water that is used for irrigation is produced mainly through desalination of sea water which is an expensive process. Materials with good water retention capabilities could be very useful in reducing the water consumed for irrigation purposes. Additionally, they can also be used to reduce erosion and water run-off in other regions of the world.

Superabsorbent polymers such as Polyacrylamides (PAM) and other acrylic based polymers have been extensively investigated as a candidate for an efficient water absorbent for irrigation purposes[1-5]. The slow absorption of water, slow biodegradation and high cost of polyacrylamides are the challenges faced which limits the wider use of this material in agriculture[6]. Additionally, even though polyacrylamides are not toxic, traces of toxic unpolymerized arcylamide can be present in commercially available polyacrylamides which makes it unsafe for use in agriculture[7]. Natural materials such as wood chips and saw dust can be applied as soil amendments to increase the water storage capacity of sandy soils, however, water retention in wood is low[8]. Cheap and biodegradable water absorbing polymers could be an answer to address the irrigation challenges in arid climates.

Cellulose is the most abundant biopolymer which can be extracted inexpensively from plants, some animals, fungi, algae and bacteria[9,10]. More importantly, it is abundantly present in the form of paper waste. Cellulose is known for its hydrophilicity, chirality, broad modifying capacity and its formation of versatile semicrystalline fiber morphologies[11]. The biodegradable nature of this inexhaustible biopolymer has encouraged scientists to develop cellulose based composite materials which can be used as eco-friendly substitutes to existing non-biodegradable fossil fuel based counterparts. Modifying native cellulose can change its structure and crystallinity which essentially determine its physical properties, accessibility to chemical modification, swelling and adsorption phenomenon[10]. Polysaccharide based superabsorbent materials have also been explored. They are produced mainly through graft polymerization of suitable vinyl monomer(s) on polysaccharide in the presence of a cross-linker or direct cross-linking of polysaccharides[12,13].

SUMMARY OF THE INVENTION

A first aspect of the invention is a method of making a water-retaining gel composition. The method comprises: hydrolyzing cellulose in a dissolution media to form a first mixture; then combining said first mixture with an antisolvent to form a precipitate, said antisolvent comprising a swellable hydrophilic polymer and water; and then, in any order; separating the precipitate from excess antisolvent and excess dissolution media; optionally adjusting or neutralizing the pH of the precipitate; and optionally washing the precipitate with water to form the water-retaining gel composition.

In some embodiments, the gel composition has a pH of from 4 to 9.

In some embodiments, the method further comprises the step of drying the composition.

In some embodiments, the method further comprises the step of mixing the precipitate (dried or hydrated) with particulate media (e.g., sand) to form a mixture thereof. In some embodiments, the method further comprises the step of drying the mixture (e.g., to form a hygroscopic composition such as a hygroscopic sand composition).

A further aspect of the invention is a water-retaining gel composition, comprising, consisting of or consisting essentially of: (a) from 1 or 2 percent by weight to 80 or 90 percent by weight of networked cellulose; (b) from 5 or 10 percent by weight to 95 or 99 percent by weight of a swellable hydrophilic polymer in said networked cellulose; and (c) optionally, water to balance. The composition may be provided in hydrated or dry form as noted above.

The compositions of the invention are useful for the preparation of media such as growth media for growing plants, as discussed further below.

The foregoing and other objects and aspects of the present invention are explained in greater detail in the drawings herein and the specification set forth below. The disclosures of all United States Patent references cited herein are to be incorporated by reference herein in their entirety.

BRIEF DESCRIPTION OF THE DRAWINGS

FIG. 1: X-Ray diffractogram of GELPEO, Cellulose II, MCC and PEO.

FIG. 2: TEM images of GELPEO (a & b) showing networked dark regions (Cellulose) and packets of encapsulated lighter regions (PEO).

FIG. 3: Schematic of GELPEO formed through aqueous PEO assisted regeneration of cellulose.

FIG. 4: DSC curve (a) and Thermogravimetric analysis (b) for samples of hydrated sand, cotton and GELPEO.

FIG. 5: (a) Weight and (b) weight loss of wet sand samples with different weight percentages of GELPEO and cotton over time during outdoor testing.

DETAILED DESCRIPTION OF THE PREFERRED EMBODIMENTS

"Cellulose" as used herein may comprise, consist of or consist essentially of any suitable natural cellulose material or partially processed cellulose, including but not limited to microcrystalline cellulose, hydroxymethyl cellulose, cellulose per se (e.g., cotton cellulose), hydroxypropyl cellulose, methylcellulose, and combinations thereof.

"Microcrystalline cellulose" is known. It is typically a purified, partially depolymerized cellulose that is prepared by treating alpha cellulose, in the form of a pulp manufactured from fibrous plant material, with mineral acids. See, e.g., U.S. Pat. No. 4,744,987. It is a generally white, odorless, tasteless, relatively free flowing powder that is generally insoluble in water, organic solvents, dilute alkalis and dilute acids. U.S. Pat. No. 2,978,446 to Battista et al. and U.S. Pat. No. 3,146,168 to Battista describe microcrystalline cellulose and its manufacture; the latter patent concerns microcrystalline cellulose for pharmaceutical applications.

"Dissolution media" as used herein may be any suitable dissolution media. In general, such a media breaks or disrupts the hydrogen bonding between individual cellulose chains and substantially isolates individual cellulose chains by surrounding them with ions and solvent molecules. Examples of dissolution media include, but are not limited to, acid solutions such as sulfuric acid, nitric acid, phosphoric acid, organic solvents, ionic liquids, basic solutions (e.g., NaOH, NaOH/Urea solutions) LiCl/DMAc solutions, and the like, including suitable combinations thereof.

"Hydrophilic polymer" as used herein may be any suitable hydrophilic polymer. The hydrophilic polymer is preferably a swellable hydrophilic polymer (that is, a polymer that absorbs water). Examples include, but are not limited to, homopolymers and copolymers of N-vinylpyrrolidone, N-vinyllactam, N-vinyl butyrolactam, N-vinyl caprolactam, vinyl acetate, vinyl priopionate, and other vinyl compounds having polar pendant groups, polyvinylpyrrolidone, polyvinyl alcohol, methylcellulose, ethylcellulose, hydroxyalkylcelluloses, hydroxypropylcellulose, hydroxyalkylalkylcellulose, hydroxypropylmethylcellulose, cellulose phthalate, cellulose succinate, cellulose acetate phthalate, hydroxypropylmethylcellulose phthalate, hydroxypropylmethylcellulose succinate, hydroxypropylmethylcellulose acetate succinate, polyethers such as polyethylene oxide or polyethylene glycol, polypropylene oxide, copolymer of ethylene oxide and propylene oxide, methacrylic acid/ethyl acrylate copolymer, methacrylic acid/methyl methacrylate copolymer, butyl methacrylate/2-dimethylaminoethyl methacrylate copolymer, poly(hydroxyalkyl acrylate), poly(hydroxyalkyl methacrylate), copolymer of vinyl acetate and crotonic acid, partially hydrolyzed polyvinyl acetate, polysaccharides, carrageenan, galactomannan, gelatins, natural gums or plant gums such as locust bean gum and xanthan gum, etc., and combinations (including copolymers) thereof. See, e.g., U.S. Pat. No. 8,025,899; see also U.S. Pat. Nos. 7,790,250; 7,759,368; 7,221,294; and 5,800,412.

"Insoluble media" as used herein may be any suitable material, including but not limited to sand, perlite, vermiculite, clay, fiberglass, rockwool, gravel, lava rock, clay, saw dust, sphagnum moss, and combinations thereof. In some embodiments the media is preferably an inorganic media. In some embodiments, the media is preferably a particulate media. In some embodiments, the media preferably comprises sand.

Preparation of Gel and Combining with Hydrophilic Polymer.

The aqueous networked cellulose gel (sometimes also referred to as "coagulated cellulose", "hydrated cellulose gel" or "regenerated cellulose") used to carry out the present invention can be produced by any suitable technique. Examples include, but are not limited to, those disclosed in U.S. Pat. Nos. 7,790,457; 7,195,735; 6,875,756; 6,630,214; 6,630,214; 6,458,460; 6,391,376; 6,350,422; 6,344,189; 6,287,625; 6,350,422; 6,344,189; 6,315,907; 6,287,625; 6,096,258; 5,958,830; 5,932,270; 5,688,547; 5,498,420; 5,401,588; 5,306,685; 5,082,682; 4,341,807; 4,374,702; 4,378,381; 4,452,721; 4,452,722; 4,464,287; 4,483,743; 4,487,634; and 4,500,546.

In some embodiments, the gel is produced by, first, dissolving cellulose (including cellulose derivatives such as microcrystalline cellulose) in a dissolution media to form a first mixture. The first mixture is then combined with an aqueous solution of a hydrophilic polymer (e.g., polyethylene oxide) as antisolvent to form a precipitate. Once the precipitate is formed it can be separated from excess antisolvent and dissolution media by any suitable technique (e.g., by centrifugation, filtering, settling, etc., including combinations thereof). Prior to and/or after separation, the pH of the precipitate can be adjusted (e.g., by dialysis and/or titration, optionally with mixing such as by sonication). In addition, the precipitate is preferably washed (prior to and/or after separation, and prior to and/or after pH adjusting) with an aqueous wash media (e.g., distilled water) to form the aqueous networked cellulose gel. The gel itself typically comprises, or consists essentially of from 70, 80 or 90 percent to 99.5 or 99.9 percent by weight water; and from 0.1 or 0.5 to 10, 20 or 30 percent by weight networked cellulose. The aqueous networked cellulose gel typically has a pH of from 4, 5 or 6 to 7.5, 8 or 9.

If desired, the gel can be partially or fully dried prior to subsequent use thereof. As discussed below, the gel can be combined (in dried form or in hydrated form) with an insoluble media (typically a particulate mineral media such as sand), to provide a plant growth media as discussed further below.

Soil Enrichment and Plant Propagation.

"Plant" as used herein includes all members of the plant kingdom, particularly including higher (or "vascular") plants in the divisions Filicinae, Gymnospermae (or "gymnosperm"), and Angiospermae (or "Angiosperm"). Thus Plant" as used herein includes, but is not limited to, a crop plant, a turf grass, an ornamental species, a species grown for timber or pulp, a species grown for biofuels or species grown for pharmaceuticals. Additionally, plants for propagation in the present invention include, but are not limited to, tobacco, tomato, potato, sugar beet, pea, carrot, cauliflower, broccoli, soybean, canola, sunflower, alfalfa, cotton, rapeseed, Arabidopsis, peach, pepper, apple, chile, peanut, orange, grape, coffee, cassaya, spinach, lettuce, cucumber, wheat, maize, rye, rice, turfgrass, oat, barley, sorghum, millet, sugarcane, or banana (See, e.g., US Patent Application No. 20090143230.

"Angiosperm" as used herein includes, but is not limited to, plants of the sub-classes Monocotyledoneae (or monocots) and Dicotyledoneae (or dicots).

Monocotyledoneae (or monocots) as used herein includes but is not limited to Amaryllidaceae—the Amaryllis Family, Gramineae (Poaceae)—the Grass Family, Liliaceae—the Lily Family, Orchidaceae—the Orchid Family, Palmae (Aracaceae)—the Palm Family; and Lemnacea—the duckweed family.

Dicotyledoneae (or dicots) as used herein includes but is not limited to Cactacae—the Cactus Family, Compositae (Asteraceae)—the Sunflower Family, Cruciferae (Brassicaceae)—the Mustard Family, Cucurbitaceae—the Gourd Family, Ericaceae—the Heath Family, Euphorbiaceae—the Spurge Family, Lauraceae—the Laurel Family, Leguminosae (Fabaceae)—the Pea Family, Rosaceae—the Rose Family, Rutaceae—the Rue Family, Solanaceae—the Nightshade Family, and Umbelliferae (Apiaceae)—the Carrot family.

"Gymnosperm" as used herein includes but is not limited to conifers. Exemplary conifers which may be used in practicing the present invention are the members of the family Pinaceae, which include, for example, loblolly pine (*Pinus taeda*), slash pine (*Pinus elliotii*), longleaf pine (*Pinus palustris*), shortleaf pine (*Pinus echinata*), ponderosa pine (*Pinus ponderosa*), red pine (*Pinus resinosa*), jack pine (*Pinus banksiana*), Eastern white pine (*Pinus strobus*), Western white pine (*Pinus monticola*), sugar pine (*Pinus lambertiana*), lodgepole pine (*Pinus contorta*), Monterey pine (*Pinus radiata*), Afghan pine (*Pinus eldarica*), Scots pine (*Pinus sylvestris*), and Virginia pine (*Pinus virginiana*); Douglas-fir (*Pseudotsuga menziesii*); Western hemlock (*Tsuga canadensis*); Sitka spruce (*Picea glauca*); redwood (*Sequoia sempervirens*); the true firs including silver fir (*Abies amabilis*), grand fir (*Abies grandis*) noble fir (*Abies procera*), white fir (*Abies concolor*), balsam fir (*Abies balsamea*); and the cedars which include Western red cedar (*Thuja plicata*), incense cedar (*Libocedrus decurrens*), Port Orford cedar (*Chamaecyparis lawsoniona*), and Alaska yellow-cedar (*Chamaecyparis nootkatensis*); and Western larch (*Laryx occidentalis*). See, e.g., U.S. Pat. No. 5,122,466 to Stomp et al.

Particular examples of plants include but are not limited to all cereal and grain crops, herbs and spices (e.g., saffron crocus, vanilla orchid), oil seed crops, sugarcane, vegetable crops, brassica vegetables, bulb vegetables, cucurbit vegetables and fruit, leafy vegetables, fruiting vegetables, legume vegetables, root and tuber vegetables, tree, vine and shrub crops, berry crops (e.g., strawberry, blueberry, blackberry, raspberry, etc.), citrus (e.g., orange, grapefruit, Mandarin (including Tangerine and Satsuma), lemon, lime, and kumquat), pome fruit (e.g., apple, pear, quince, Asian pear, loquat, etc.), stone fruit (e.g., peach, apricot, prune, plum, cherries, almond, etc.), dates, olives, miscellaneous tree food crops, non-food tree crops, tree nuts, tropical and subtropical trees and fruit, vine crops, pasture grasses, forage legumes, and rangeland, grass seed or sod production, pastures, cotton, corn, soybeans, rice, wheat, greenhouse/shadehouse grown plants, ornamental, plant nurseries, Christmas trees, golf courses and turf, forestry, tobacco, orchids, flowers and roses, foliage crops, etc.

The gel compositions of the invention can be used to grow or propagate plants in a variety of ways.

In some embodiments, the present invention provides a method of enhancing water-retention in a sandy soil, comprising mixing a gel composition as described above with said soil in an amount effective to enhance water retention therein.

In some embodiments, the present invention provides a method of enhancing plant growth in a sandy soil, comprising mixing a gel composition of as described herein with said soil in an amount effective to enhance plant growth therein.

In some embodiments, the present invention provides a plant growth medium (in dried or hydrated form), comprising or consisting essentially of: (a) from 70 or 80 percent by weight to 99.7, 99.8 or 99.9 percent by weight of an insoluble media (e.g., sand); and (b) from 0.1, 0.2 or 0.3 percent by weight to 20 or 30 percent by weight of a gel composition as described herein. Additional organic or inorganic ingredients can be added to the media in accordance with known techniques, including but not limited to insecticides, fungicides, nutrients, minerals, pH adjusting agents, etc. Plants can be propagated by (a) providing such a plant growth medium, and then (b) propagating the plant in said medium.

Plant propagation with gel compositions and media can be carried out in accordance with known techniques or variations thereof that will be apparent to those skilled in the art. The plants can be propagated in any suitable site, including agricultural fields, plant beds, and greenhouses. Techniques such as irrigating and or fertilizing the plants, or treating the plants to inhibit diseases such as fungal or insect diseases, can be employed as needed, all in accordance with known procedures. Any suitable plant can be grown, as described above.

The present invention is explained in greater detail in the following non-limiting Examples.

EXPERIMENTAL

We here describe a method of modification of native cellulose to produce a novel material with enhanced water absorption and retention properties. The aim of this work is to regenerate cellulose in aqueous polyethylene oxide (PEO) so that a renewable, sustainable and a biodegradable material could be formed which has a higher water absorption and retention capability than native cellulose. It follows a similar modification procedure which is previously reported by our group[14] in which cellulose is dissolved in 70% sulfuric acid and regenerated in ethanol and water. The resulting material from that experiment was regenerated cellulose with a networked structure. However, in this case, dissolved cellulose is regenrated in an aqueous solution of polyethylene oxide (PEO). PEO is a highly hydrophilic polymer which readily dissolves in water and loses its shape. Due to this, PEO in its normal form, would run-off deep below the surface of the soil after a few times of watering. The cellulose/PEO blend reported in this work swells, but does not dissolve in water and thus maintains its physical form. The material is believed to have encapsulated PEO within the networked cellulose which gives it high hydrophilicity compared to cellulose in its native form. The material is mixed with sandy soils and is characterized for its water absorption and retention properties Methods.

Materials.

Microcrystalline Cellulose (MCC) ($M_W$=350,000) was purchased from FMC Biopolymer (Philadelphia, Pa.) and Sulfuric acid (99.9%) and Polyethylene oxide ($M_W$=4,000,000) were purchased from Aldrich (St. Louis, Mo.). Sulfuric acid was diluted to a concentration of 70% (w/w).

Acid Hydrolysis of MCC.

Acid hydrolysis is performed in a Varian dissolution system in which the water bath is adjusted to 5° C. Sulfuric acid of 70% concentration is added to a vessel and is stabilized to reach 5° C. Subsequently, 20 g MCC is added to 200 ml sulfuric acid and the resulting solution is mixed for 30 min at 5° C. at 250 revolutions per minute to form Solution A. The formed mixture is a viscous and transparent liquid of cellulose completely dissolved in sulfuric acid.

Regeneration of Cellulose.

Solution B was prepared by dissolving PEO in deionized (DI) water. PEO was dissolved in DI water and heated at 50° C. for 14 hours at 500 rpm and then left to cool to room temperature. 1 g of PEO is used for every 4 grams of MCC dissolved in sulfuric acid. In this experiment, 5 grams of PEO was dissolved in 200 g of water to yield a solution with a PEO concentration of 2.5% (w/w). The resulting volume of aqueous PEO solution was 200 ml. 5 g of PEO was used to make an aqueous solution which could regenerate 20 g of MCC. Following the mixing of MCC in sulfuric acid for 30 minutes at 5° C., PEO solution (Solution B) is added as a precipitating agent to the solution A. The resulting material is left to mix at 5° C. and 250 rpm for 30 minutes.

The concentration of sulfuric acid drops to 35% after regeneration. After the regeneration of cellulose using PEO solution, the resulting material is immediately centrifuged at 4° C. and 2400 rpm to remove sulfuric acid and excess PEO. Due to the low temperature, low concentration of sulfuric acid and shortage of time, it is believed that the PEO does not degrade. The centrifugation process resulted in separating the precipitated material from the spent liquor. The precipitate was collected again and dialyzed (against running tap water) for three days until the pH of the suspension reached 6-7. The resulting material predominantly consisted of small hydrated gel-like lumps (photograph not shown) which will be referred to as GELPEO from now onwards.

X-Ray Diffraction (XRD).

X-ray diffractograms of the samples of oven dried GELPEO, PEO (Mw 4,000,000) powder and MCC (Mw 350,000) were obtained on an X-ray diffractometer (PANalytical, X'Pert Pro). Samples of GELPEO were prepared by air drying the GELPEO suspension on Quantifoil® grids (SPI).

Transmission Electron Microscopy (TEM).

The sample for TEM was prepared using Focused ion beam (FIB) lamella lift out and thinning method. First of all a layer of Chromium was deposited on the surface of the sample to get a SEM image of the sample while doing FIB milling. Then a protection layer of silicon and then platinum was made to protect the structure of the GELPEO while milling with ion beam.

A lamella of 3*20*3 micron was lift out using a microprobe and was then thinned down to a thickness of only 150 nm which is sufficient for polymer materials to give atomic resolution in TEM. The images attached are bright field images produced by using a low intensity beam to minimize artifacts induced by the beam.

Differential Scanning Calorimetry (DSC).

Differential Scanning Calorimetry (DSC) Studies were carried out on a DSC4000 (Perkin Elmer) machine. Excess water is added to GELPEO, cotton and sandy soil and left for 5 hours to allow the materials to absorb materials to the point of saturation. The samples with excess water were collected and heated from 20° C. to 200° C. at a heating rate of 1° C./min under a nitrogen flow of 20 ml/min.

Thermogravimetric Analysis (TGA).

The Thermogravimetric Analysis study was done on a TGA6000 (Perkin Elmer) machine. The hydrated samples of GELPEO, cotton and sandy soil were placed in the TGA crucible and heated from 20° C. to 250° C. at a heating rate of 5° C./min under a nitrogen flow of 20 ml/min.

Water Absorption.

Water absorption of the different samples of materials was measured by first immersing all the samples in water for 5 hours to allow the materials to absorb water to the point of saturation. The water saturated samples were then sieved for 1 minute to drain excess water and then left to dry. The weight of the hydrated sample was taken before and after drying to measure the amount of water absorbed by each sample.

Outdoor Testing.

Samples of mixtures of sandy soil with weight proportions 0%, 0.33%, 0.67% and 1% dry GELPEO are prepared. Also, as a reference, mixtures of sandy soil with weight proportions of 1% cotton, 1% wood chips and 1% saw dust are prepared. All the samples are placed in small pots with drain holes and watered with the same weight of DI water. The water was allowed to drain and the pots were placed outside under direct sunlight. Water absorption and retention over time is measured.

Results and Discussion

X-Ray Diffraction and Transmission Electron Microscopy.

X-ray Diffraction patterns of oven dried GELPEO revealed that the material is highly amorphous when compared to the starting materials MCC and PEO powders. FIG. 1 shows that the characteristic peaks of MCC and semicrystalline PEO are not present in the diffractogram for GELPEO. Alternatively, it can be seen from FIG. 2 that the GELPEO adopts a structure very similar to that of Cellulose II. When PEO is dissolved in water and cellulose is dissolved in concentrated acid, the PEO chains randomly arrange themselves while the layers of cellulose chains are attacked by the acid and are opened up. Subsequently, when the aqueous PEO is added to acid dissolved cellulose, the cellulose regenerates immediately and gives very little time for cellulose and PEO to arrange itself in some kind of order. Consequently, the cellulose chains partially re-crystallize to a more stable networked cellulose II structure while the aqueous PEO becomes trapped within the network in this process. Therefore, PEO that is present in this blend is highly amorphous in nature and thus the XRD of GELPEO shows no semicrystalline peaks of PEO.

TEM images (FIGS. 2a and b) of GELPEO confirm the networked structure of cellulose with packets of PEO encapsulated within the networked cellulose. A similar networked structure of cellulose has been obtained earlier by our group through the exact same processing but with regeneration in water[14]. The combination of XRD and TEM images obtained suggest that the dark areas in the TEM images show networked cellulose which has some sort of order while the lighter areas represent the highly amorphous PEO which is encapsulated within the networked structure of cellulose. A schematic of the structure of GELPEO formed through aqueous PEO assisted regeneration of acid soluble cellulose is shown in FIG. 3. The high molecular weight and hydrophilic PEO which is encapsulated within the networked cellulose is believed to give the material a gel like physical appearance.

Differential Scanning Calorimetry and Thermogravimetric Analysis.

FIG. 4a shows the DSC curves obtained for samples of sand, cotton and GELPEO with excess water. The DSC curves obtained for the three samples each showed two endothermic peaks. One peak at around 110° C. is common between all the three samples and this corresponds to the phase change of the unabsorbed or free water in the sample. The other peak is identified as the thermal energy needed to separate the absorbed water from the surface of the specific material being tested. Water that is absorbed by sand is released at a relatively low temperature of 90° C. while water is retained in cotton and GELPEO up till 125° C. and 140° C. respectively. The high water retention by GELPEO shows that GELPEO is capable of storing water for longer times at higher temperatures.

Thermogravimetric analysis (FIG. 4b) corroborates the behavior observed by the DSC. When the hydrated samples of sand, cotton and GELPEO are heated, the evaporation of water takes place at different rates. The slowest rate of weight loss occurred in the sand sample as the amount of water absorbed in the sand sample was very small. The evaporation rate of water occurs at the same rate in the cotton and GELPEO sample up till the boiling point of water as identified by the DSC. The rate of water loss after that slows down considerably for the GELPEO sample as it is believed that there are strong forces between water molecules and the GELPEO surface which gives it the hydrophilic nature. This allows GELPEO to absorb and retain more water compared to cotton.

Water Absorption.

Water absorption was measured for samples of sand, cotton, GELPEO, wood chips and saw dust. From the results it was found that the hydrated sample of sand contained only 20% water while the hydrated cotton and hydrated GELPEO sample contained 90% and 95% water by weight. This is also corroborated by the thermogravimetric analysis done on hydrated samples of sand, cotton and GELPEO in FIG. 4b. Hydrated samples of traditional organic materials such as wood chips and saw dust contained 70% and 89% water. Water content of 95% by weight in the GELPEO sample is significantly higher than the water content found in the other samples and signifies that GELPEO is capable of absorbing water up to 20 times its own weight.

Outdoor Testing.

the outdoor testing clearly demonstrated the effect of adding small percentages of GELPEO in sand. Firstly, draining of the tested samples revealed that most of the water escaped from the neat sand sample. The samples with increasing weight percentages of GELPEO managed to absorb more water and thus had higher weights after water draining. Within the first hour, a major difference was noted between the samples with 0%, 0.5% and 1% GELPEO in sand. The neat sand sample lost water very quickly. It took 45 hours for the sample with 1% GELPEO to lose the amount of water that the neat sand sample had lost in 1 hour. The sample with 1% cotton lost water at a slower rate compared to neat sand but at almost double the rate as the sample with 1% GELPEO. It can also be seen that the rate of decrease of water over the first 24 hours was much less for the samples with small percentages of GELPEO. Table 1 shows the weights of the drained samples and the time taken to evaporate all the water from the tested samples.

FIG. 5a and FIG. 5b show the decrease in the weight of GELPEO over time under outdoor testing after draining of water. From FIG. 5, it can be seen that the evaporation rate of water in the different samples varied according to the amount of GELPEO added. As the percentage of GELPEO in the sample increases, the water retention capability of the sample also increases. The outdoor tests were performed in the mid of June which is representative of summer weather in Abu Dhabi. Table 1 notes the maximum, average and minimum day and night temperature recorded during the period of testing. FIG. 5b shows the loss of water against time. Samples with GELPEO retain more than half of the water content over the first 24 hours while samples with 1% cotton and 0% GELPEO lose most of its water content in the first 24 hours.

TABLE 1

Experimental results of sand samples with different percentages of GELPEO and cotton

| Sample | Day temperature (° C.) | Night temperature (° C.) | Weight without water (g) | Weight after water added (g) | Weight after excess water drained (g) | Time to evaporate all water (hours) |
|---|---|---|---|---|---|---|
| Sand | Max.: 43.5 | Max.: 35.6 | 150 | 232.8 | 218.1 | 50 |
| Sand + 0.33% GELPEO | Avg.: 37.1 | Avg.: 30.0 | 150 | 232.8 | 230.4 | 99 |
| Sand + 0.67% GELPEO | Min.: 26.8 | Min.: 24.0 | 150 | 232.8 | 229.5 | 123 |
| Sand + 1% GELPEO | | | 150 | 232.8 | 230.7 | 149 |
| Sand + 1% Cotton | | | 150 | 232.8 | 231.4 | 73 |

CONCLUSIONS

A novel functional material is developed which is based on cellulose and PEO. The material is mainly amorphous with cellulose being regenerated partially in cellulose II structure. TEM images revealed a networked structure of cellulose with packets of PEO encapsulated within the network. Due to the fast regeneration process, little time is allowed for PEO or cellulose to arrange itself and thus both exist in mostly amorphous forms in the blend. The material is capable of retaining water above the boiling point of water and that the water loss from the material is slower than that from cotton. It is found that GELPEO is capable of holding water 20 times its own weight while neat sand and other organic soil amendments such as wood chips and saw dust have poor water absorption properties. Due to this, the water run-off during irrigation could be reduced and water could be conserved.

Furthermore, it is found from the outdoor testing that the addition of 1% GELPEO in sand could significantly increase the absorption and retention of water. With the addition of 1% GELPEO in sand, water could be retained for more than three times longer under the same environmental conditions. The development of this material can be significant in decreasing the frequency of irrigation, which would contribute to the lowering of water consumption in arid climates. The enhanced water retention ensures that crops grown would have much better availability of water and could thus grow at a faster rate than normal. Since this material is based on cellulose, its use would be environmentally friendly unlike current commercial polyacrylamides based materials.

REFERENCES

1. R. A. I. Azzam, *Communications in Soil Science and Plant Analysis*, 11, 767-834 (1980).
2. M. Silberbush, E. Adar and Y. De Malach, *Agricultural Water Management*, 23, 303-313 (1993).
3. L. Brannon-Peppas and R. S. Harland, *Absorbent Polymer Technology*, Elsevier, Amsterdam, 1990.
4. F. L. Buchholz and A. T. Graham, *Modern superabsorbent polymer technology*, Wiley-VCH New York, 1998.
5. T. Shimomura and T. Namba. in *Superabsorbent Polymers*; American Chemical Society, 1994, p 112-127.
6. M. S. Johnson, *Journal of the Science of Food and Agriculture*, 35, 1196-1200 (1984).
7. C. G. Daughton, *Quantitation of acrylamide (and polyacrylamide): critical review of methods for trace deter-* mination/formulation analysis and future-research recommendations. *Final report*, Daughton (Christian G.), Orinda, Calif. (USA), 1988.
8. J. G. Davis and C. R. Wilson. Colorado State University, 2010.
9. D. Klemm, D. Schumann, F. Kramer, N. Heβler, M. Hornung, H. Schmauder and S. Marsch, *Polysaccharides II*, 49-96 (2006).
10. M. M. de Souza Lima and R. Borsali, *Macromolecular Rapid Communications*, 25, 771-787 (2004).
11. D. Klemm, B. Heublein, H. Fink and A. Bohn, *Angewandte Chemie International Edition*, 44, 3358-3393 (2005).
12. M. J. Zohuriaan-Mehr and K. Kabiri, *Iranian Polymer Journal*, 17, 451-477 (2008).
13. T. Ichikawa and T. Nakajima, *Polymeric materials encyclopedia*, 3, 8051-8059 (1996).
14. R. Hashaikeh and H. Abushammala, *Carbohydrate Polymers*, 83, 1088-1094 (2011).

The foregoing is illustrative of the present invention, and is not to be construed as limiting thereof. The invention is defined by the following claims, with equivalents of the claims to be included therein.

That which is claimed is:

1. A method of making a water-retaining gel composition, comprising:
    dissolving hydrolyzed cellulose completely in a dissolution media to form a first mixture;
    combining said first mixture with an antisolvent to form a precipitate, said antisolvent comprising a swellable hydrophilic polymer and water;
    separating said precipitate from excess antisolvent and excess dissolution media;
    optionally adjusting or neutralizing the pH of said precipitate; and
    washing said precipitate with water to form said water-retaining gel composition.

2. The method of claim 1, wherein said gel composition has a pH of from 4 to 9.

3. The method of claim 1, wherein said hydrophilic polymer comprises polyethylene oxide.

4. The method of claim 1, further comprising the step of drying said composition.

5. The method of claim 1, further comprising the step of mixing said precipitate with particulate media to form a mixture thereof.

6. The method of claim 1, wherein the cellulose comprises microcrystalline cellulose.

7. The method of claim 1, wherein the dissolution media comprises sulfuric acid.

8. The method of claim 5, wherein the particulate media comprises sand.

9. A method of making a hygroscopic water-retaining gel composition, comprising:
    dissolving hydrolyzed cellulose completely in a dissolution media to form a first mixture;
    combining said first mixture with an antisolvent to form a precipitate, said antisolvent comprising polyethylene oxide and water;
    separating said precipitate from excess antisolvent and excess dissolution media;
    mixing said precipitate with particulate media;
    optionally adjusting or neutralizing the pH of said precipitate; and
    washing said precipitate with water to form said water-retaining gel composition having a pH of from 4 to 9; and
    drying said composition to produce said water-retaining gel hygroscopic composition.

10. The method of claim 9, wherein said cellulose comprises microcrystalline cellulose, and said dissolution media comprises sulfuric acid.

11. The method of claim 9, wherein said particulate media comprises sand.

* * * * *